US010089291B2

(12) United States Patent
Tu et al.

(10) Patent No.: US 10,089,291 B2
(45) Date of Patent: Oct. 2, 2018

(54) INK STROKE EDITING AND MANIPULATION

(71) Applicant: Microsoft Technology Licensing, LLC, Redmond, WA (US)

(72) Inventors: Xiao Tu, Medina, WA (US); Krishnan Menon, Redmond, WA (US); Fei Xiong, Redmond, WA (US); Connor Lawrence Weins, Bellevue, WA (US); Patrick Jee-An Poon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 227 days.

(21) Appl. No.: 14/887,169

(22) Filed: Oct. 19, 2015

(65) Prior Publication Data
US 2016/0253300 A1   Sep. 1, 2016

Related U.S. Application Data

(60) Provisional application No. 62/126,362, filed on Feb. 27, 2015.

(51) Int. Cl.
*G06F 17/24* (2006.01)
*G06F 3/0484* (2013.01)
*G06F 3/0488* (2013.01)
*G06T 11/20* (2006.01)

(52) U.S. Cl.
CPC ........ *G06F 17/242* (2013.01); *G06F 3/04845* (2013.01); *G06F 3/04883* (2013.01); *G06T 11/20* (2013.01); *G06T 11/203* (2013.01)

(58) Field of Classification Search
None
See application file for complete search history.

(56) References Cited

U.S. PATENT DOCUMENTS

| 5,347,295 A | 9/1994 | Agulnick et al. |
| 5,561,446 A | 10/1996 | Montlick |

(Continued)

FOREIGN PATENT DOCUMENTS

| WO | 9209966 A1 | 6/1992 |
| WO | 9428476 A2 | 12/1994 |

(Continued)

OTHER PUBLICATIONS

Jarrett, R. et al., "Overview of the Managed API", Building Tablet PC Applications, Chapter 3—Introduction to the Tablet PC Platform SDK, Available online at http://people.cs.clemson.edu/~pargas/courses/cs481/fall2005/text/is014_files/viewer_r.htm, Published on Oct. 25, 2002, Retrieved on Oct. 20, 2015, 8 pages.

(Continued)

*Primary Examiner* — Yu Chen
(74) *Attorney, Agent, or Firm* — Alleman Hall Creasman & Tuttle LLP

(57) ABSTRACT

A platform-level container configured to hold natively-supported ink stroke data structures is maintained. The platform-level container is accessible to a plurality of different applications. An ink stroke visual corresponding to each ink stroke data structure held by the platform-level container is rendered via a display. An ink stroke change event corresponding to an ink stroke data structure held by the platform-level container is recognized. The ink stroke data structure is changed to an updated ink stroke data structure in accordance with the ink stroke change event. An ink stroke visual corresponding to the updated ink stroke data structure is rendered via the display without re-rendering ink stroke visuals corresponding to unchanged ink stroke data structures.

20 Claims, 12 Drawing Sheets

(56) References Cited

U.S. PATENT DOCUMENTS

| | | | |
|---|---|---|---|
| 5,710,831 | A | 1/1998 | Beemink et al. |
| 6,573,898 | B1 | 6/2003 | Mathur et al. |
| 6,839,464 | B2 | 1/2005 | Hawkins et al. |
| 7,016,055 | B2 | 3/2006 | Dodge et al. |
| 7,120,872 | B2 | 10/2006 | Thacker |
| 7,158,675 | B2 | 1/2007 | Gounares et al. |
| 7,174,042 | B1 | 2/2007 | Simmons et al. |
| 7,346,229 | B2 | 3/2008 | Dresevic et al. |
| 7,352,366 | B2 * | 4/2008 | Dresevic ............... G06T 11/203 178/18.01 |
| 7,397,949 | B2 * | 7/2008 | Dresevic ............... G06F 17/241 345/179 |
| 7,436,535 | B2 | 10/2008 | Dodge et al. |
| 7,499,058 | B2 | 3/2009 | Van Ness et al. |
| 7,701,457 | B2 | 4/2010 | Seok-Hyung |
| 7,774,722 | B2 | 8/2010 | Hoyer et al. |
| 7,924,284 | B2 | 4/2011 | Ewanchuk et al. |
| 8,116,569 | B2 | 2/2012 | Markiewicz et al. |
| 8,130,226 | B2 | 3/2012 | Brunner et al. |
| 8,160,363 | B2 | 4/2012 | Byun |
| 8,166,388 | B2 | 4/2012 | Gounares et al. |
| 8,189,922 | B2 | 5/2012 | Zawacki et al. |
| 8,203,527 | B2 | 6/2012 | Low et al. |
| 8,416,197 | B2 | 4/2013 | Feng et al. |
| 8,427,424 | B2 * | 4/2013 | Hartmann ............. G06F 3/0416 345/156 |
| 8,847,961 | B2 | 9/2014 | Marison |
| 9,589,241 | B2 | 3/2017 | Schneider et al. |
| 2003/0214531 | A1 | 11/2003 | Chambers et al. |
| 2003/0214553 | A1 * | 11/2003 | Dodge ................. G06F 3/04883 347/41 |
| 2003/0215142 | A1 * | 11/2003 | Gounares ............. G06F 3/0481 382/190 |
| 2003/0217336 | A1 * | 11/2003 | Gounares ............. G06F 3/0481 715/268 |
| 2005/0044295 | A1 * | 2/2005 | Wakeam ................ G06F 17/242 710/72 |
| 2005/0088420 | A1 | 4/2005 | Dodge et al. |
| 2005/0289452 | A1 * | 12/2005 | Kashi ................... G06F 17/2247 715/232 |
| 2006/0031755 | A1 * | 2/2006 | Kashi ..................... G06F 17/242 715/201 |
| 2006/0093218 | A1 * | 5/2006 | Gounares ............. G06F 3/0481 382/187 |
| 2006/0274057 | A1 | 12/2006 | Van Ness et al. |
| 2007/0188480 | A1 | 8/2007 | Teng et al. |
| 2007/0292032 | A1 * | 12/2007 | Silverman ........... G06F 3/04883 382/187 |
| 2009/0002392 | A1 | 1/2009 | Hou et al. |
| 2009/0158219 | A1 * | 6/2009 | Raghupathy .......... G06F 17/273 715/863 |
| 2010/0103118 | A1 | 4/2010 | Townsend et al. |
| 2010/0277505 | A1 | 11/2010 | Ludden et al. |
| 2010/0289820 | A1 * | 11/2010 | Hoyer ................. G06F 3/04886 345/619 |
| 2011/0310118 | A1 | 12/2011 | Asmi et al. |
| 2013/0100074 | A1 | 4/2013 | Chang et al. |
| 2013/0201112 | A1 | 8/2013 | Large et al. |
| 2014/0143692 | A1 | 5/2014 | Wigdor et al. |
| 2014/0168096 | A1 * | 6/2014 | Bathiche ............... G06F 3/0412 345/173 |
| 2014/0210798 | A1 | 7/2014 | Wilson |
| 2014/0240322 | A1 | 8/2014 | Brumer et al. |
| 2015/0054842 | A1 | 2/2015 | Cornell |
| 2015/0077355 | A1 | 3/2015 | McCanny et al. |
| 2016/0179364 | A1 * | 6/2016 | Nicholson ........... G06F 3/04883 715/863 |

FOREIGN PATENT DOCUMENTS

| | | | | |
|---|---|---|---|---|
| WO | WO 9428476 | A2 * | 12/1994 | ............. G06T 11/00 |
| WO | 2005029391 | A1 | 3/2005 | |
| WO | 2005045574 | A2 | 5/2005 | |

OTHER PUBLICATIONS

Henzen, A. et al., "Sketching With a Low-Latency Electronic Ink Drawing Tablet", Proceedings of the 3rd International Conference on Computer Graphics and Interactive Techniques in Australasia and South East Asia, Nov. 29, 2005, 10 pages.

Egger, M., "Get Control and Performance with the Real Time Stylus API", Available at http://www.markusegger.com/articles/Article_aspx?quickid=0512052, Available as early as May 17, 2006, Retrieved on Oct. 20, 2015, 18 pages.

Yeh, R. et al., "Iterative Design of a Paper + Digital Toolkit: Supporting Designing, Developing, and Debugging", Technical Report, Stanford University InfoLab, Available at http://ilpubs.stanford.edu:8090/801/, Deposited on Mar. 29, 2007, 10 pages.

"RealTimeStyus Reference", Microsoft Developer Technologies, Windows Dev Center, Available at: http://msdn.microsoft.com/en-us/library/windows/desktop/ms701683(v=vs.85).aspx, Build date: Sep. 7, 2011, Available as early as Feb. 4, 2012, Retrieved on Oct. 20, 2015, 2 pages.

"What's new for XAML and DirectX Interop in Windows 8.1", Windows Apps Team, Building Apps for Windows, Available at https://blogs.windows.com/buildingapps/2013/11/19/whats-new-for-xaml-and-directx-interop-in-windows-8-1/, Published on Nov. 19, 2013, Retrieved on Oct. 20, 2015, 10 pages.

"Direct Manipulation", Windows Dev Center—Desktop, Available at https://msdn.microsoft.com/en-us/library/windows/desktop/hh446969(v=vs.85).aspx, Build date: Nov. 16, 2013, Available as early as Dec. 19, 2013, Retrieved on Oct. 20, 2015, 3 pages.

"Preview Events", Windows Dev Center, http://msdn.microsoft.com/en-us/library/ms752279(v=vs.110).aspx, Available as early as Oct. 31, 2013, Retrieved on Mar. 23, 2015, 4 pages.

"The Ink Threading Model", Microsoft Developer Network, Available at https://msdn.microsoft.corn/library/ms788744(v=vs.90).aspx, Available as early as Jul. 17, 2014, Retrieved on Oct. 20, 2015, 4 pages.

IPEA European Patent Office, Second Written Opinion Issued in Application No. PCT/US2016/016256, dated Aug. 16, 2016, WIPO, 6 pages.

IPEA European Patent Office, International Preliminary Report on Patentability Issued in PCT Application No. PCT/US2016/016256, dated Nov. 4, 2016, WIPO, 8 pages.

"InkCanvas Class", Retrieved on: Mar. 5, 2015 Available at: https://msdn.microsoft.com/en-us/library/system.windows.controls.inkcanvas(v=vs.110).aspx.

"InkCollector Class", Retrieved on: Mar. 5, 2015. Available at: https://msdn.microsoft.com/en-us/library/ms836493.aspx.

Hinckley et al., "Pen + Touch = New Tools", In Proceedings of the 23nd Annual ACM Symposium on User Interface Software and Technology, Oct. 3, 2010, pp. 27-36.

Ao et al., "Structuralizing Digital Ink for Efficient Selection", In Proceedings of the 11th International Conference on Intelligent User Interfaces, Jan. 29, 2006, pp. 148-154.

Liao et al., "PapierCraft: A Gesture-Based Command System for Interactive Paper", In Proceeding of ACM Transactions on Computer-Human Interaction (TOCHI), vol. 14, Issue 4, Jan. 1, 2008, 31 pages.

Oh et al., "The Challenges and Potential of End-User Gesture Customization", In Proceedings of the SIGCHI Conference on Human Factors in Computing Systems, Apr. 27, 2013, pp. 1129-1138.

Guimbretiére, François, "Paper Augmented Digital Documents", In Proceedings of the 16th Annual ACM Symposium on User Interface Software and Technology, Nov. 2, 2003, pp. 51-60.

ISA European Patent Office, International Search Report and Written Opinion issued in PCT Application No. PCT/US2016/016256, dated Apr. 12, 2016, WIPO, 11 pages.

Hong, et al., "Satin: A Toolkit for Informal Ink-Based Applications", In Proceedings of the 13th Annual ACM Symposium on User Interface Software and Technology (UIST '00), Nov. 1, 2000, 10 pages.

"Final Office Action Issued in U.S. Appl. No. 14/500,997", dated Jul. 28, 2016, 12 Pages.

"Non-Final Office Action Issued in U.S. Appl. No. 14/500,997", dated Dec. 18, 2015, 12 Pages.
"Notice of Allowance Issued in U.S. Appl. No. 14/500,997", dated Jan. 11, 2017, 5 Pages.
"Notice of Allowance Issued in U.S. Appl. No. 14/500,997", dated Feb. 10, 2017, 2 Pages.
"Observer Pattern—Wikipedia The Free Encyclopedia", Retrieved from «https://en.wikipedia.org/w/index.php?title=Observer_pattern&oldid=650941501», Apr. 22, 2016, 4 Pages.
"Second Written Opinion Issued in PCT Application No. PCT/US2016/018565", dated Aug. 4, 2016, 9 Pages.
"International Preliminary Report on Patentability Issued in PCT Application No. PCT/US2015/052755", dated Dec. 20, 2016, 10 Pages.
"International Search Report & Written Opinion Issued in PCT Application No. PCT/US2015/052755", dated Dec. 9, 2015, 11 Pages.
"Second Written Opinion Issued in PCT Application No. PCT/US2015/052755", dated Aug. 26, 2016, 9 Pages.
"International Preliminary Report on Patentability issued in PCT Application No. PCT/US2016/018565", dated Jun. 22, 2017, 10 pages.
"International Search Report and Written Opinion Issued in PCT Application No. PCT/US2016/018565", dated May 11, 2016, 16 Pages.

* cited by examiner

INK STROKE EDITING AND MANIPULATION

CROSS REFERENCE TO RELATED APPLICATIONS

This application claims priority to U.S. Provisional Patent Application 62/126,362, entitled "DIGITAL INK EDITING AND MANIPULATION," filed on Feb. 27, 2015, the entirety of which is hereby incorporated herein by reference.

BACKGROUND

User input mimicking strokes of a drawing instrument may be rendered by a computing device as digital ink presented on a display. For example, ink stroke user input may be provided by touching a touch sensor (e.g., a touch pad or a touch display) with a finger. In another example, ink stroke user input may be provided by a pointing device, such as a stylus or a mouse.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A platform-level container configured to hold natively-supported ink stroke data structures is maintained. The platform-level container is accessible to a plurality of different applications. An ink stroke visual corresponding to each ink stroke data structure held by the platform-level container is rendered via a display. An ink stroke change event corresponding to an ink stroke data structure held by the platform-level container is recognized. The ink stroke data structure is changed to an updated ink stroke data structure in accordance with the ink stroke change event. An ink stroke visual corresponding to the updated ink stroke data structure is rendered via the display without re-rendering ink stroke visuals corresponding to unchanged ink stroke data structures.

DETAILED DESCRIPTION

User interface (UI) framework-specific digital ink renderers provide basic, low-level functionality with limited flexibility. For example, when an application desires to visually present a plurality of ink strokes in an area of a graphical user interface, the application provides a bitmap of the entire area including the plurality of ink strokes to the digital ink renderer for rendering. Subsequently, if the application desires to change an ink stroke in the area, then the application has to provide an updated bitmap of the entire area to the digital ink renderer. In other words, each time an ink stroke is changed, all ink strokes are re-rendered.

Furthermore, each application that interacts with such an ink renderer has to provide any additional ink rendering functionality on an individual basis. By placing the burden of providing such additional ink rendering functionality on the applications, a data storage size of the applications may be increased. In some cases, such an increase may be particularly inefficient due to the same ink rendering functionality being repetitively built into multiple different applications.

Furthermore, such a digital ink renderer is only compatible with applications that are implemented in the particular UI framework in which the digital ink renderer is implemented. Such a digital ink renderer is not compatible with applications that are implemented in different UI framework technologies.

Accordingly, this description relates to providing built-in support for high performance digital ink editing at a platform level that allows developers to manipulate and edit digital ink in a performant and flexible manner across different UI framework technologies. More particularly, this description relates to maintaining a platform-level container configured to hold natively-supported ink stroke data structures corresponding to rendered ink stroke visuals. The platform-level container may enable rendering of only ink stroke visuals corresponding to changed or updated ink stroke data structures held by the platform-level container without re-rendering ink stroke visuals corresponding to unchanged ink stroke data structures. By only rendering ink stroke visuals corresponding to updated ink stroke data structures, rendering may be performed in a more performant manner (e.g., consume less memory) relative to an approach where all ink stroke visuals are re-rendered whenever an ink stroke data structure is updated.

Figure 1:
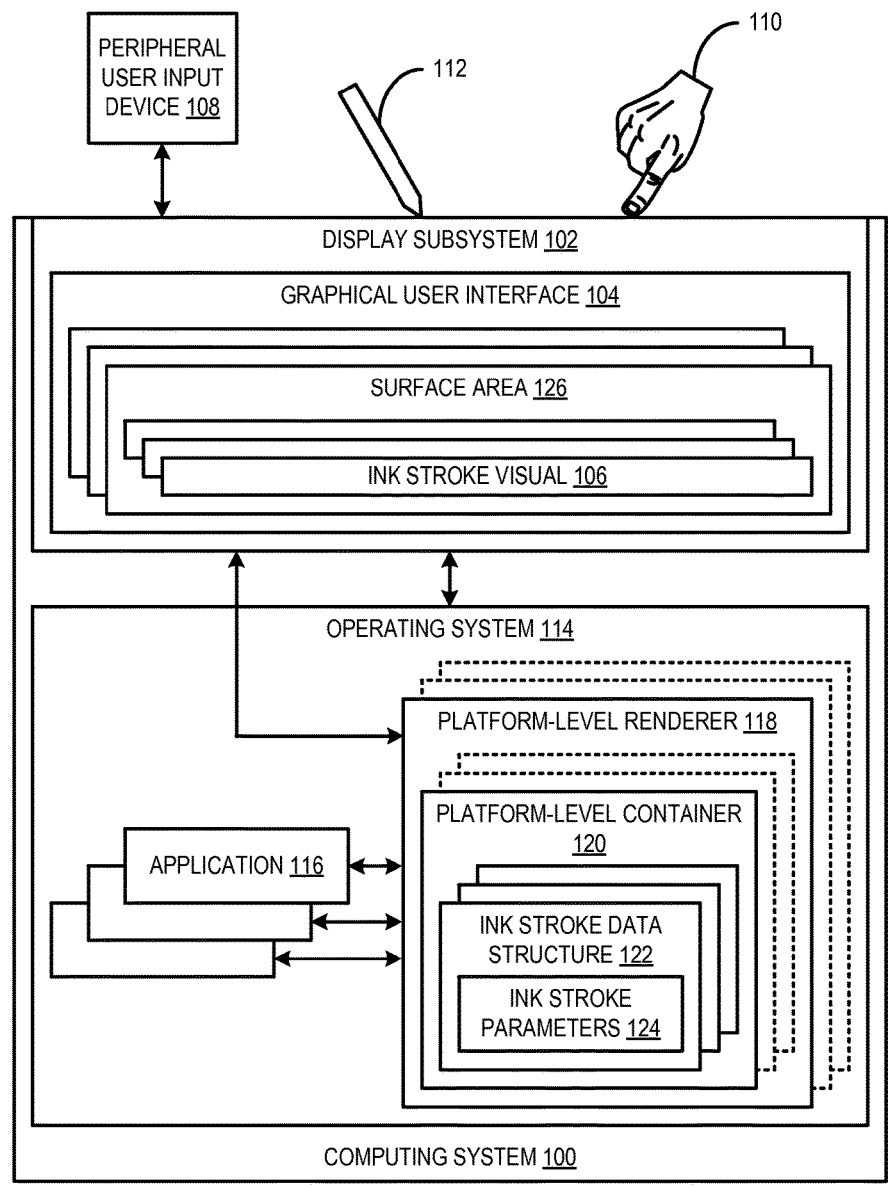
FIG. 1 shows an example computing system including an architecture for rendering ink stroke visuals.

FIG. 1 shows an example computing system 100 in simplified form. The computing system 100 may take the form of one or more personal computers, tablet computers, home-entertainment computers, augmented or virtual reality computers, network computing devices, gaming devices, mobile computing devices, mobile communication devices (e.g., smart phone), and/or other computing devices.

The computing system 100 includes a display subsystem 102 configured to visually present a graphical user interface 104. Within the graphical user interface 104, the display subsystem 102 may be configured to visually present one or more ink stroke visuals 106.

For example, the ink stroke visuals 106 may be visually presented based on user input to the computing system 100. User input may be provided to the computing system 100 to visually present ink stroke visuals in any suitable manner. In one example, user input may be provided to the computing system 100 by a peripheral user input device 108, such as a mouse. In some implementations, the display subsystem 102 may include a touch sensor, and user input may be provided to the computing system 100 in the form of touch input. In one example, touch input may be provided to the computing system 100 by one or more fingers 110. In another example, touch input may be provided to the computing system 100 by a stylus 112. Touch input may be provided to the computing system 100 to visually present ink stroke visuals in any suitable manner. In some implementations, touch input may be interpreted as a particular gesture from a menu of recognizable gestures, and the particular gesture may be used to affect operation of the computing system 100. In one example, an ink stroke data structure may be changed to an updated ink stroke data structure based on a particular gesture as will be discussed in further detail below.

The computing system 100 includes an operating system 114 configured to manage operation of hardware and software resources of the computing system 100. For example, the operating system 114 may schedule tasks for allocation of processor resources, storage resources, and other resources of the computing system 100. In particular, the operating system 114 may act as an intermediary for a plurality of applications 116 executed by the computing system 100 to perform various functionality of the plurality of applications 116 via hardware of the computing system 100. The plurality of applications 116 may include any suitable type of application. Although the plurality of applications 116 will be discussed in the context of managing ink stroke data structures and correspondingly rendering ink stroke visuals, the plurality of applications 116 may provide any suitable functionality.

The computing system 100 includes one or more platform-level renderers 118 configured to composite an image representing the graphical user interface 104, and send the image to the display subsystem 102 for visual presentation. The one or more platform-level renderers 118 may perform any suitable processing to render the image of the graphical user interface 104. Non-limiting example processing operations may include blending, fading, scaling, and other 2D and 3D animation effects.

The one or more platform-level renderers 118 may be configured to maintain one or more platform-level containers 120 configured to hold one or more natively-supported ink stroke data structures 122. Each ink stroke data structure 122 held by the platform-level container 120 may correspond to an ink stroke visual 106 rendered via the display subsystem 102 and visually presented in the graphical user interface 104. Each ink stroke data structure may be configured to define the corresponding ink stroke visual such that the corresponding platform-level renderer 118 and/or other logic can translate the data structure into a displayable image. A change to an ink stroke data structure 122 held by a platform-level container 120 may directly affect visual presentation of an ink stroke visual 106 corresponding to the ink stroke data structure 122.

In some implementations, a separate instance of a platform-level renderer 118 may be created for each platform-level container 120. Each platform-level renderer 118 may be independently configured to render ink with different attributes and for different types of input. Further, in some implementations, each application of the plurality of applications 116 may communicate with a separate platform-level renderer 118. In other implementations, a platform-level renderer 118 may maintain a plurality of platform-level containers 120 having the same or different attributes. In yet other implementations, a single platform-level renderer 118 may maintain all platform-level containers 120.

Each ink stroke data structure 122 may include a plurality of ink stroke parameters 124 that define a corresponding ink stroke visual 106. The ink stroke parameters 124 may include any suitable type of parameter. Non-limiting example ink stroke parameters include a position (e.g., an ordered sequence of screen coordinates), path, joint attributes, a pressure, a color, a thickness, a tip shape (e.g., pen, brush, highlighter), a transparency, and a transformation. In one example, a single ink stroke data structure may include parameters that define one continuous line. For example, an ink stroke data structure created as a result of touch input may define a continuous line between a touch down event and a lift up event. In another example, an ink stroke data structure created as a result of user input via a mouse may define a continuous line between a mouse button depress event and a mouse button release event. In some implementations, the ink stroke visual 106 may be represented by one or more Bezier curves.

In some implementations, the ink stroke data structures 122 may represent "dry" ink stroke visuals that are created upon completion of an ink stroke user input event. For example, an ink stroke user input event may be completed responsive to a finger that performed the ink stroke user input being lifted from a display (or other touch sensor). In another example, an ink stroke user input event may be completed responsive to a stylus that performed the ink stroke user input being lifted from a display (or other touch sensor). In yet another example, an ink stroke user input event may be completed responsive to a depressed mouse button being released.

In some implementations, the computing system 100 may utilize a buffer data structure that represents a "wet" ink stroke visual. Further, the buffer data structure optionally may be included in the platform-level container 120. The buffer data structure may enable a wet ink stroke visual to be quickly transformed into dry ink stroke visual.

The platform-level containers 120 may be accessible to the plurality of applications 116, via one or more different application programming interfaces (APIs), for example. Such accessibility may allow the plurality of applications 116 to change an ink stroke data structure 122 directly in the platform-level container 120. Because the container 120 is maintained at the platform level, an application implemented in any particular UI framework may be able to interact with the platform-level container 120. Moreover, because the container 120 is maintained at the platform level, an application may be relieved of the responsibility of tracking a state of the container within the application. In other words, because the container 120 is maintained at the platform level, the plurality of applications 116 may be easily informed of the ink stroke data structures 122 that are held by the platform-level container 120.

In some implementations, the graphical user interface 104 may be divided into one or more areas 126. The graphical user interface 104 may be divided into any suitable number of different areas having any suitable dimensions. In some cases, different areas 126 may be associated with different applications 116. In some implementations, a platform-level container 120 may be associated with each different area 126 of the graphical user interface 104. In some cases, a platform-level container 120 may be associated with multiple different areas 126.

Furthermore, each platform-level renderer 118 may have a different set of attributes that affect a manner in which ink stroke data structures 122 held by the platform-level container 120 of the platform-level renderer 118 are changed. In other words, different platform-level containers/renderers may have different ink stroke rendering behavior relative to ink stroke rending behavior of other platform-level containers/renderers. For example, different platform-level renderers may respond to different types of user input differently. In one particular example, a first platform-level renderer may have attributes specifying that ink stroke visuals are created based on touch input via a finger, and a second platform-level renderer may have different attributes specifying that ink stroke visuals are created based on touch input via a stylus. In another example, different platform-level renderers may respond to a same type of user input differently. In one example, touch input applied via a finger to a first area may cause "inking" that adds ink stroke data structures to a first platform-level container managed by a first platform-level renderer associated with the first area. Further, the same touch input applied via a finger to a second area may cause "erasing" that removes ink stroke data structures from a second platform-level container managed by a second platform-level renderer associated with the second area. In yet another example, first and second platform-level renderers may have the same attributes and may change ink stroke data structures held by the respective platform-level containers in the same manner.

The one or more platform-level renderers 118 may be configured to recognize various ink stroke change events corresponding to ink stroke data structures 122 held by the platform-level containers 120. Ink stroke change events may be generated based on various operations of the computing system 100 and/or may be received by the one or more platform-level renderers 118 from various sources of the computing system 100. In one example, a platform-level renderer 118 may receive an ink stroke change event from a particular application of the plurality of applications 116. An application 116 may perform any suitable operation to generate an ink stroke change event. In another example, a platform-level renderer 118 may receive an ink stroke change event from the display subsystem 102 (or another intermediate event handler component) responsive to user input to the computing system 100.

The one or more platform-level renderers 118 may be configured to change an ink stroke data structure 122 held by a platform-level container 120 to an updated ink stroke data structure in accordance with the recognized ink stroke change event. The one or more platform-level renderers 118 may change an ink stroke data structure to an updated ink stroke data structure in accordance with an ink stroke change event in any suitable manner. In one example, an ink stroke change event specifies adding an ink stroke data structure to a platform-level container. In another example, an ink stroke change event specifies removing an ink stroke data structure from a platform-level container. In yet another example, an ink stroke change event specifies modifying a parameter of an ink stroke data structure held by a platform-level container. Non-limiting example modifications of parameters of an ink stroke data structure include changing a color, changing a thickness, changing a path, applying a transformation, and changing a tip shape. In one particular example, ink and pen tip parameters may be modified separately. For example, a transformation can be applied to a tip shape to build special pen types. In another example, ink parameters can be modified with or without changing a stroke width/size. A parameter of an ink stroke data structure may be modified in any suitable manner in accordance with an ink stroke change event.

Because each ink stroke data structure 122 corresponds to an ink stroke visual 106, when an ink stroke data structure 122 is changed to an updated ink stroke data structure, the corresponding ink stroke visual 106 may be rendered to reflect the updated ink stroke data structure. Moreover, each ink stroke data structure 122 may be processed individually, which allows for selective rendering of individual ink stroke visuals 106. In other words, an ink stroke visual corresponding to an updated ink stroke data structure may be rendered without re-rendering ink stroke visuals corresponding to unchanged ink stroke data structures. Such a rendering approach may be more performant (e.g., consume less memory) relative to an approach where all ink stroke visuals are re-rendered whenever an ink stroke data structure is updated.

Figure 2:
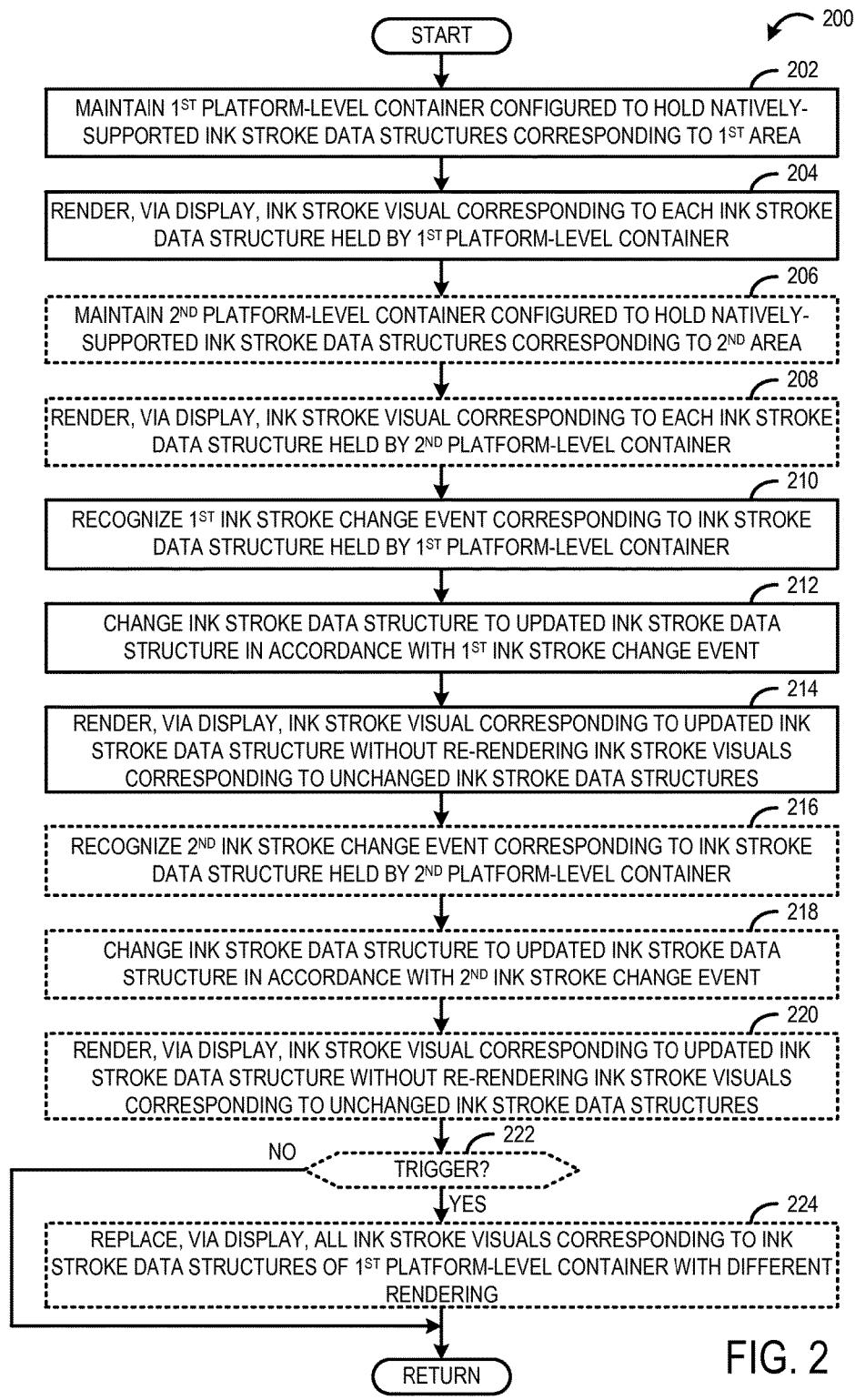
FIG. 2 shows an example method for rendering ink stroke visuals.
Figure 9:
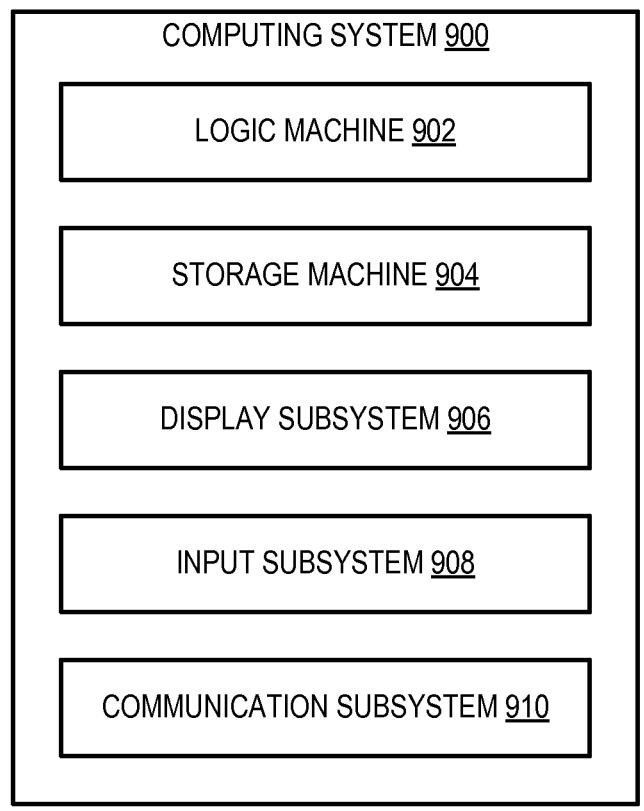
FIG. 9 shows an example computing system.

FIG. 2 shows an example method 200 for rendering ink stroke visuals. In one example, the method 200 is performed by the computing system 100 shown in FIG. 1. In another example, the method 200 is performed by the computing system 900 shown in FIG. 9.

FIGS. 4A-4H, 5A-5B, and 6A-6B show various operations that may be performed by a computing system (e.g., the computing system 100 shown in FIG. 1 or the computing system 900 shown in FIG. 9) in the course of performing the method 200, and will be referenced throughout discussion of the method 200.

At 202, the method 200 includes maintaining a first platform-level container configured to hold natively-supported ink stroke data structures. At 204, the method 200 includes rendering, via a display, an ink stroke visual corresponding to each ink stroke data structure held by the first platform-level container.

Figure 4A:
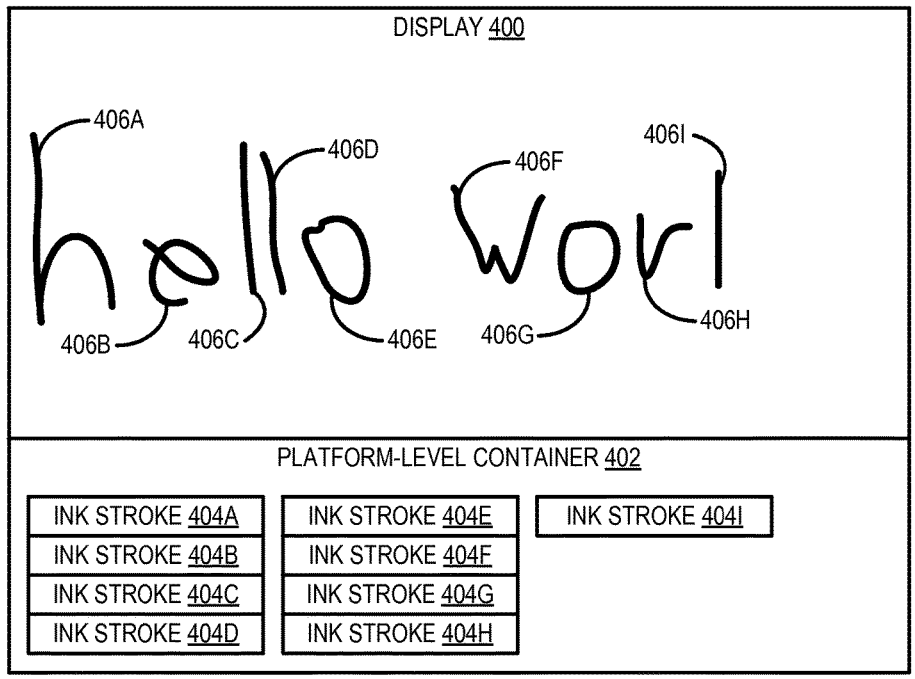
FIGS. 4A-4H show example scenarios in which one or more ink stroke visuals corresponding to updated ink stroke data structures are rendered.

FIG. 4A shows an example display 400 and schematically displays a platform-level container 402. In one example, the display 400 represents the display subsystem 102 shown in FIG. 1, and the platform-level container 402 represents the platform-level container 120 shown in FIG. 1. The platform-level container 402 includes a plurality of ink stroke data structures 404 (e.g., 404A, 404B, 404C, 404D, 404E, 404F, 404G, 404H, 404I). The plurality of ink stroke data structures 404 correspond to a plurality of ink stroke visuals 406 (e.g., 406A, 406B, 406C, 406D, 406E, 406F, 406G, 406H, 406I) rendered via the display 400. In particular, each ink stroke data structure has a one-to-one correspondence with an ink stroke visual, although this is not required in all implementations. In the depicted example, each ink stroke visual 406 visually represents a hand-written letter, and the plurality of ink stroke visuals collectively spell "hello worl." The plurality of ink stroke data structures 404 and the corresponding plurality of ink stroke visuals 406 may be generated in any suitable manner. In one example, the plurality of ink stroke data structures 404 are added to the platform-level container 402 responsive touch input by a finger to the display 400. Further, the plurality of ink stroke visuals 406 are rendered via the display 400 responsive to the plurality of ink stroke data structures 404 being added to the platform-level container 402.

Continuing with FIG. 2, in some implementations, at 206, the method 200 optionally may include maintaining a second platform-level container configured to hold natively-supported ink stroke data structures. In some cases, the first and second platform-level containers may have different ink stroke rendering behavior (e.g., based on corresponding platform-level renderers having different attributes). In some cases, the first and second platform-level containers may have the same ink stroke rendering behavior (e.g., based on corresponding platform-level renderers having the same attributes).

The different platform-level containers may have different uses. In one example, the different platform-level containers correspond to different areas of the graphical user interface 104 shown in FIG. 1. In another example, the different platform-level containers correspond to different windows of the graphical user interface 104 shown in FIG. 1. In another example, the different platform-level containers are controlled by different applications 116 shown in FIG. 1.

In some implementations, at 208, the method 200 optionally may include rendering, via the display, an ink stroke visual corresponding to each ink stroke data structure held by the second platform-level container.

Figure 5A:
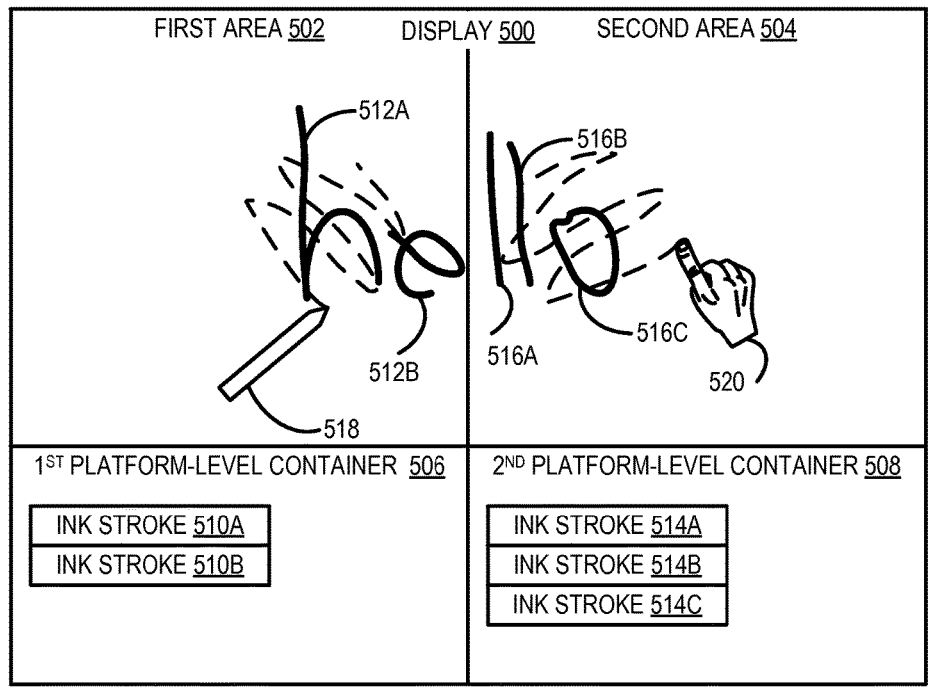
FIGS. 5A-5B show an example of different platform-level containers behaving differently responsive to different types of user input.

FIG. 5A shows an example display 500 including a first area 502 and a second area 504. A first platform-level container 506 corresponds to the first area 502 and a second platform-level container 508 corresponds to the second area 504. The first platform-level container 506 includes a plurality of ink stroke data structures 510 (e.g., 510A, 510B). The plurality of ink stroke data structures 510 correspond to a plurality of ink stroke visuals 512 (e.g., 512A, 512B) that are rendered in the first area 502. The second platform-level container 508 includes a plurality of ink stroke data structures 514 (e.g., 514A, 514B, 514C). The plurality of ink stroke data structures 514 correspond to a plurality of ink stroke visuals 516 (e.g., 516A, 516B, 516C) that are rendered in the second area 504.

Continuing with FIG. 2, at 210, the method 200 includes recognizing a first ink stroke change event corresponding to an ink stroke data structure held by the first platform-level container. In one example, the ink stroke change event may be received from a particular application of a plurality of applications that have access to the platform-level container 402, such as the plurality of applications 116 shown in FIG. 1. In another example, the ink stroke change event may be recognized responsive to a user input. An ink stroke change event may be recognized in any suitable manner.

At 212, the method 200 includes changing the ink stroke data structure to an updated ink stroke data structure in accordance with the first ink stroke change event.

At 214, the method 200 includes rendering, via the display, an ink stroke visual corresponding to the updated ink stroke data structure held by the first platform-level container without re-rendering ink stroke visuals corresponding to unchanged ink stroke data structures.

FIGS. 4B-4H show different example ink stroke change events that change an ink stroke data structure 404 of the platform-level container 402 of FIG. 4A to an updated ink stroke data structure, which results in rendering of a corresponding ink stroke visual via the display 400

Figure 4B:
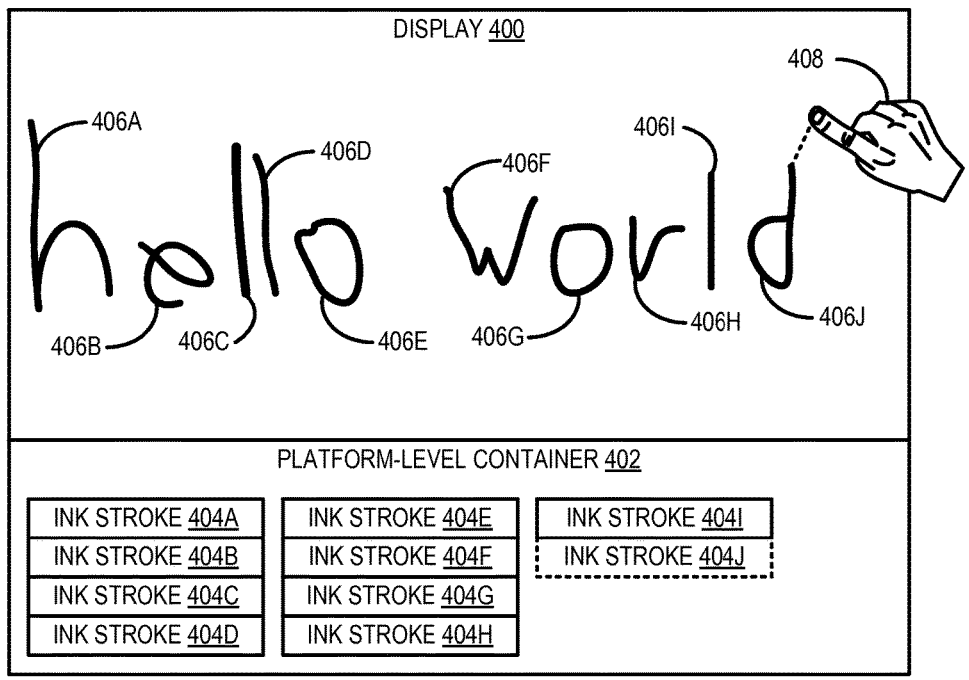

In one example shown in FIG. 4B, the ink stroke change event includes a finger 408 providing touch input to the display 400 in the form of a hand-written letter "d." In response to the finger 408 being lifted from the display 400, which "dries the ink," an ink stroke data structure 404J is added to the platform-level container 402. In one example, the ink stroke data structure 404J may be generated based on wet ink stroke information stored in a wet ink buffer data structure included in the platform-level container. Further, a corresponding ink stroke visual 406J is rendered via the display without the unchanged ink stroke visuals 406A, 406B, 406C, 406D, 406E, 406F, 406G, 406H, 406I being re-rendered.

Figure 4C:
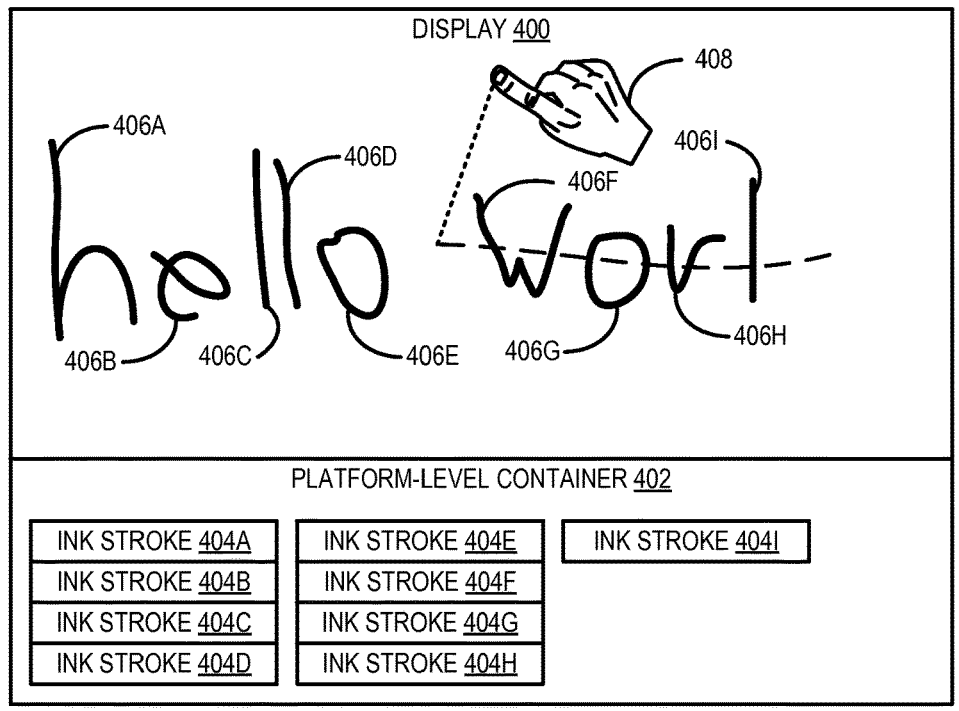
Figure 4D:
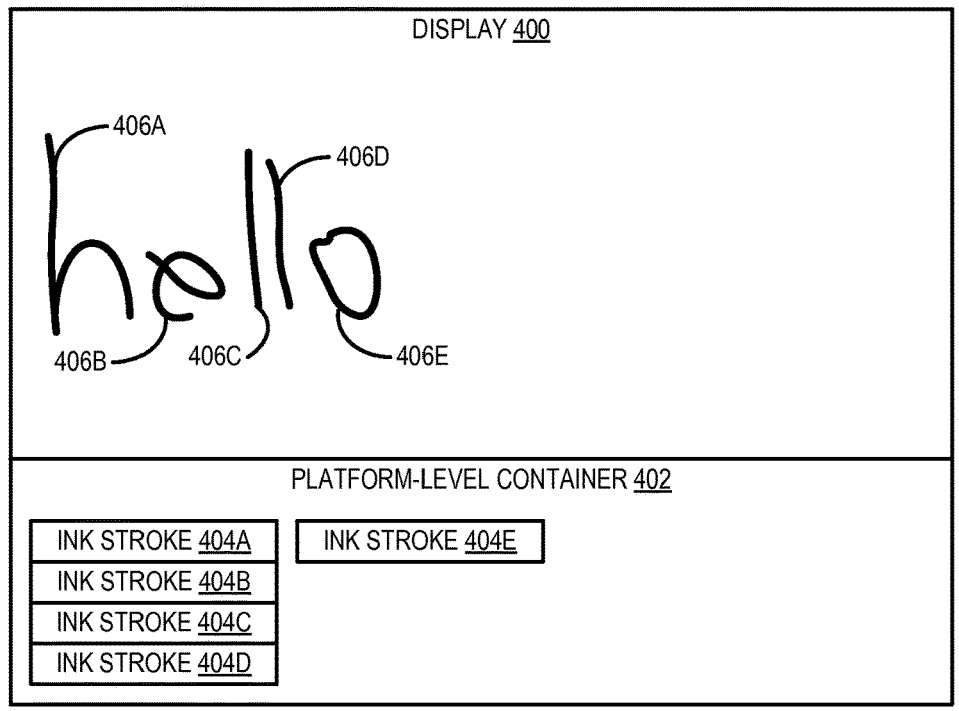

In another example shown in FIG. 4C, the ink stroke change event includes a finger 408 providing touch input to the display 400 in the form of a "strike" through the ink stroke visuals 406F, 406G, 406H, 406I. In this example, in response to the finger 408 being lifted from the display 400, an erase gesture may be recognized based on the strike through the ink stroke visuals. The ink stroke data structures corresponding to the ink stroke visuals affected by the erase gesture may be changed to updated ink stroke data structures based on the gesture. In particular, as shown in FIG. 4D, the ink stroke data structures 404F, 404G, 404H, 404I are removed from the platform-level container 402 based on the erase gesture. Further, the ink stroke visuals 406F, 406G, 406H, 406I corresponding to the updated ink stroke data structures are removed from the display without the unchanged ink stroke visuals 406A, 406B, 406C, 406D, 406E being re-rendered. In some implementations, instead of removing the ink stroke data structures affected by the erase gesture from the platform-level container, the affected data structures instead may be flagged for no rendering/display. As such, the affected data structures may be easily rendered at a later time responsive to a changed flag (e.g., responsive to an undo erase gesture or other input).

This scenario describes a particular example in which an ink stroke change event includes recognizing an erase gesture and changing ink stroke data structures held by the platform-level container based on the erase gesture. The concept demonstrated in this example may be broadly applicable to any suitable gesture. As such, in some implementations, the method 200 optionally may include interpreting user input as a particular gesture from a menu of recognizable gestures, and changing an ink stroke data structure to an updated ink stroke data structure based on the particular gesture.

Figure 4E:
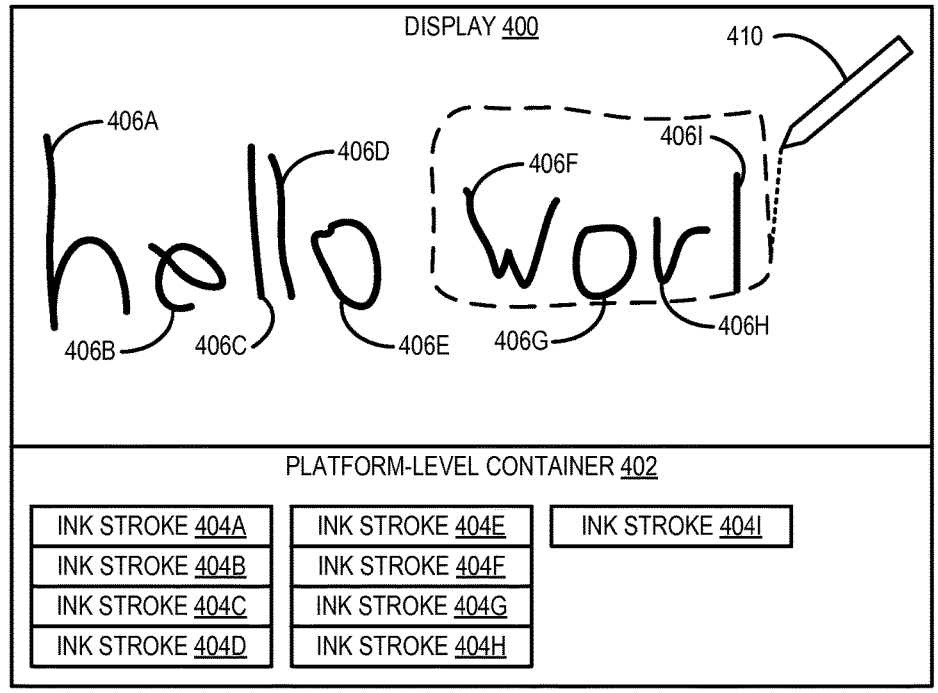
Figure 4F:
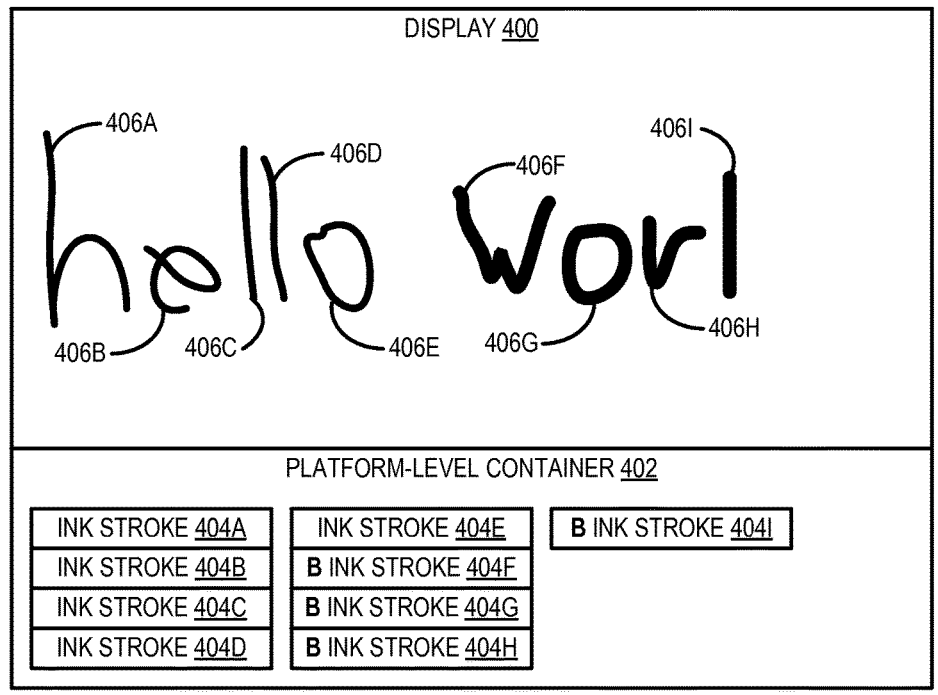

In another example shown in FIG. 4E, the ink stroke change event includes a stylus 410 providing touch input to the display 400 that surrounds the ink stroke visuals 406F, 406G, 406H, 406I. The stylus input may be recognized as a selection gesture that identifies/flags the ink stroke containers and/or corresponding visuals as being selected for subsequent operations. As such, in response to the stylus 410 being lifted from the display 400, the ink stroke visuals 406F, 406G, 406H, 406I may be selected and the corresponding containers may be queued to receive subsequent input (e.g., bold line command) The ink stroke data structures 404F, 404G, 404H, 404I corresponding to the ink stroke visuals 406F, 406G, 406H, 406I may be changed to updated ink stroke data structures. In particular, as shown in FIG. 4F, the ink stroke data structures 404F, 404G, 404H, 404I each have a "B" indicating that a width value of each ink stroke data structure is increased to a bold width. Further, the ink stroke visuals 406F, 406G, 406H, 406I corresponding to the updated ink stroke data structures are re-rendered to appear bold without the unchanged ink stroke visuals 406A, 406B, 406C, 406D, 406E being re-rendered.

Returning to FIG. 2, in some implementations, at 216, the method 200 optionally may include recognizing a second ink stroke change event corresponding to an ink stroke data structure held by the second platform-level container.

In some implementations, at 218, the method 200 includes changing the ink stroke data structure to an updated ink stroke data structure in accordance with the second ink stroke change event.

In some implementations, at 220, the method 200 optionally may include rendering, via the display, an ink stroke visual corresponding to the updated ink stroke data structure held by the second platform-level container without re-rendering ink stroke visuals corresponding to unchanged ink stroke data structures.

Figure 5B:
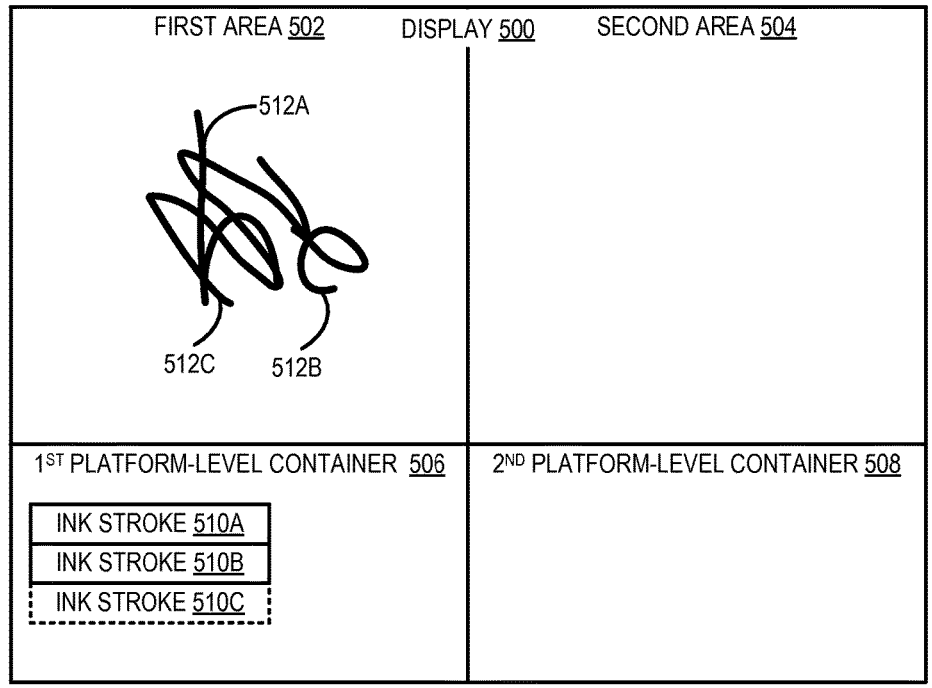

FIGS. 5A-5B show an example of different platform-level containers behaving differently responsive to different types of user input based on the different platform-level containers being managed by different platform-level renderers having different attributes. As shown in FIG. 5A, a stylus 518 provides touch input to the display 500 that overlaps the ink stroke visuals 510A, 510B in the first area 502. Further, a finger 520 provides touch input to the display 600 that overlaps the ink stroke visuals 516A, 516B, 516C in the second area 504. The user input provided by the stylus 518 and the user input provided by the finger 520 may be processed differently based on the touch input being provided to the different areas 502, 504 corresponding to the different platform-level containers 506, 508 that are managed by different platform-level renderers having different attributes.

In FIG. 5B, the first platform-level container 506 is managed by a platform-level renderer configured such that touch input via the stylus 518 is recognized as an ink stroke change event that adds an ink stroke data structure 510C to the platform-level container 506. As such, an ink stroke visual 512C that corresponds to the ink stroke data structure 510C is rendered via the display 600 without re-rendering of the unchanged ink stroke visuals 512A, 512B.

Furthermore, the second platform-level container 508 is managed by a platform-level renderer configured such that touch input via the finger 520 is recognized as an ink stroke change event that removes the ink stroke data structures 514A, 514B, 514C from the second platform-level container 508 (or flags the affected ink stroke data structures for no rendering/display without removing the affected ink stroke data structures from the platform-level container). As such, the ink stroke visuals 516A, 516B, 516C that correspond to the ink stroke data structures 514A, 514B, 514C are removed from the display. This example demonstrates the concept of different platform-level containers being managed by different platform-level configured to respond to different kinds of user input differently. Different platform-level renderers may be configured to respond differently to different types of user input in any suitable manner.

Figure 6A:
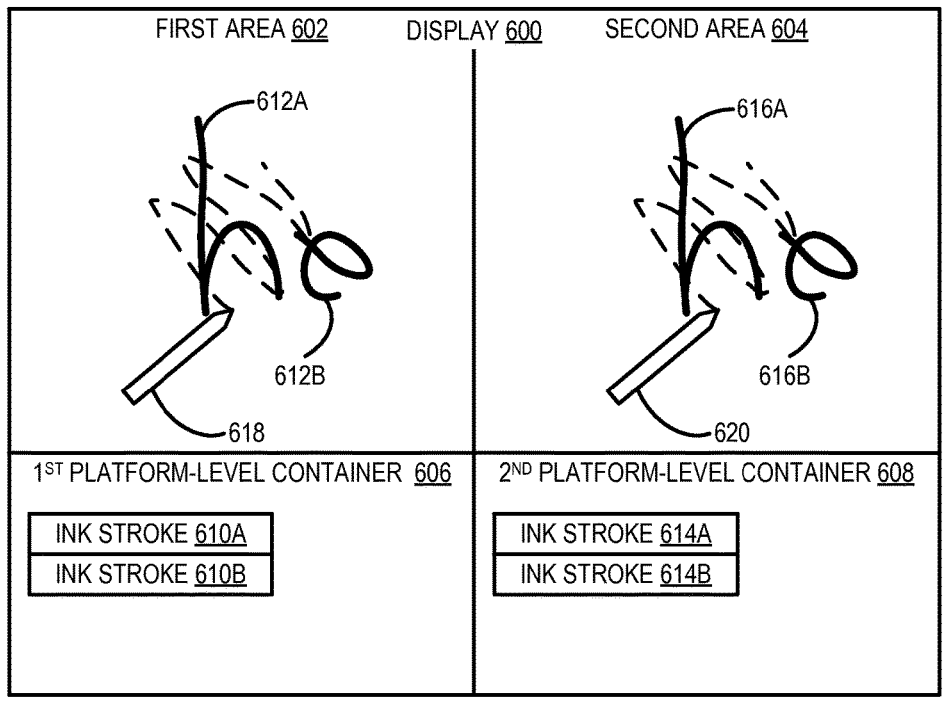
FIGS. 6A-6B show an example of different platform-level containers behaving differently responsive to a same type of user input.
Figure 6B:
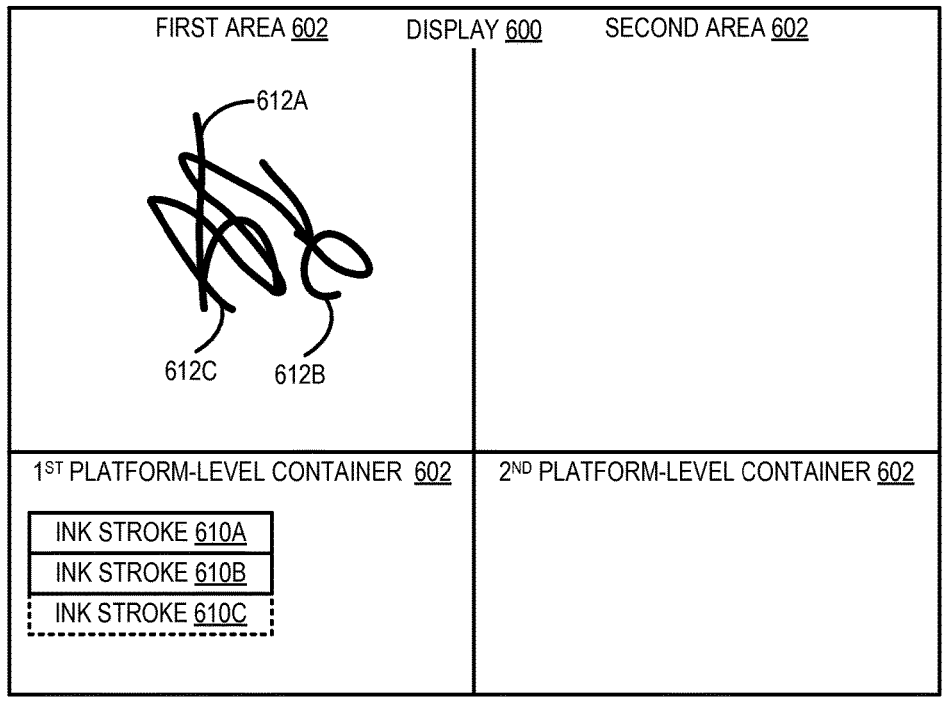

FIGS. 6A-6B show an example of different platform-level containers behaving differently responsive to a same type of user input based on the different platform-level containers being managed by different platform-level renderers having different attributes. FIG. 6A shows an example display 600 including a first area 602 and a second area 604. A first platform-level container 606 corresponds to the first area 602 and a second platform-level container 608 corresponds to the second area 604. The first platform-level container 606 includes a plurality of ink stroke data structures 610 (e.g., 610A, 610B). The plurality of ink stroke data structures 610 correspond to a plurality of ink stroke visuals 612 (e.g., 612A, 612B) that are rendered in the first area 602. The second platform-level container 608 includes a plurality of ink stroke data structures 614 (e.g., 614A, 614B). The plurality of ink stroke data structures 614 correspond to a plurality of ink stroke visuals 616 (e.g., 616A, 616B) that are rendered in the second area 604.

As shown in FIG. 6A, a stylus 618 provides touch input to the display 600 that overlaps the ink stroke visuals 610A, 610B in the first area 602. Further, a stylus 620 provides touch input to the display 600 that overlaps the ink stroke visuals 616A, 616B in the second area 604. The user input provided by the stylus 618 and the user input provided by the stylus 620 may be processed differently based on the touch input being provided to the different areas 602, 604 corresponding to the different the platform-level containers 606, 608 that are managed by different platform-level renderers having different attributes.

In FIG. 6B, the first platform-level container 606 is managed by a platform-level renderer configured such that touch input via the stylus 618 is recognized as an ink stroke change event that adds an ink stroke data structure 610C to the platform-level container 506. As such, an ink stroke visual 612C that corresponds to the ink stroke data structure 610C is rendered via the display 600 without re-rendering of the unchanged visual ink strokes 612A, 612B.

Furthermore, the second platform-level container 608 is managed by a platform-level renderer configured such that touch input via the stylus 620 is recognized as an ink stroke change event that removes the ink stroke data structures 614A, 614B from the second platform-level container 608 (or flags the affected ink stroke data structures for no rendering/display without removing the affected ink stroke data structures from the platform-level container). As such, the ink stroke visuals 616A, 616B that correspond to the ink stroke data structures 614A, 614B are removed from the display. This example demonstrates the concept of different platform-level containers being configured to respond to a same type of user input differently. Different platform-level containers may be configured to respond differently to a same type of user input in any suitable manner.

Returning to FIG. 2, in some implementations, at 222, the method 200 optionally may include determining whether a trigger has occurred. Any suitable trigger may be determined in any suitable manner. In one example, a trigger may include an application sending a command to a platform-level renderer. In another example, a trigger may include a particular type of user input. In another example, a trigger may include interpreting user input as a particular gesture from a menu of recognizable gestures. If the trigger is determined, then the method 200 moves to 224. Otherwise, the method 200 returns to other operations.

In some implementations, at 224, the method 200 optionally may include replacing, via the display, all ink stroke visuals corresponding to ink stroke data structures of the first platform-level container with a different rendering in response to the trigger.

All ink stroke visuals corresponding to ink stroke data structures of the first platform-level container may be replaced with any suitable different rendering. In one example, the different rendering may be derived from a different platform-level container including different ink stroke data structures corresponding to different ink stroke visuals. In another example, the different rendering may be derived from or take the form of an image. In another example, the different rendering may be derived from a set of drawing primitives (e.g., shapes) other than ink stroke data structures.

Figure 4G:
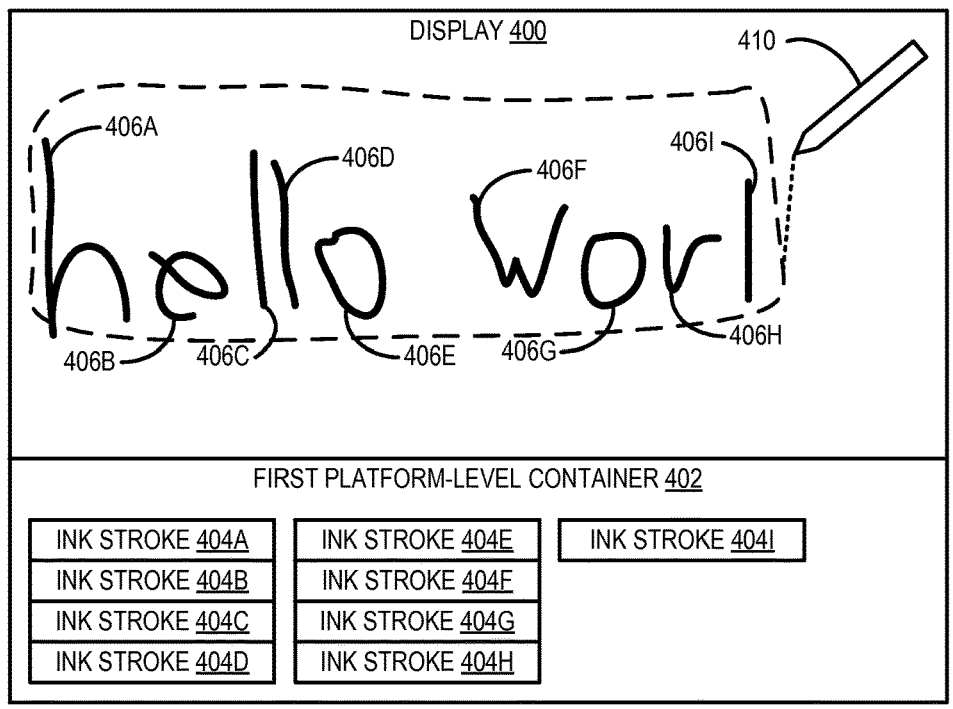
Figure 4H:
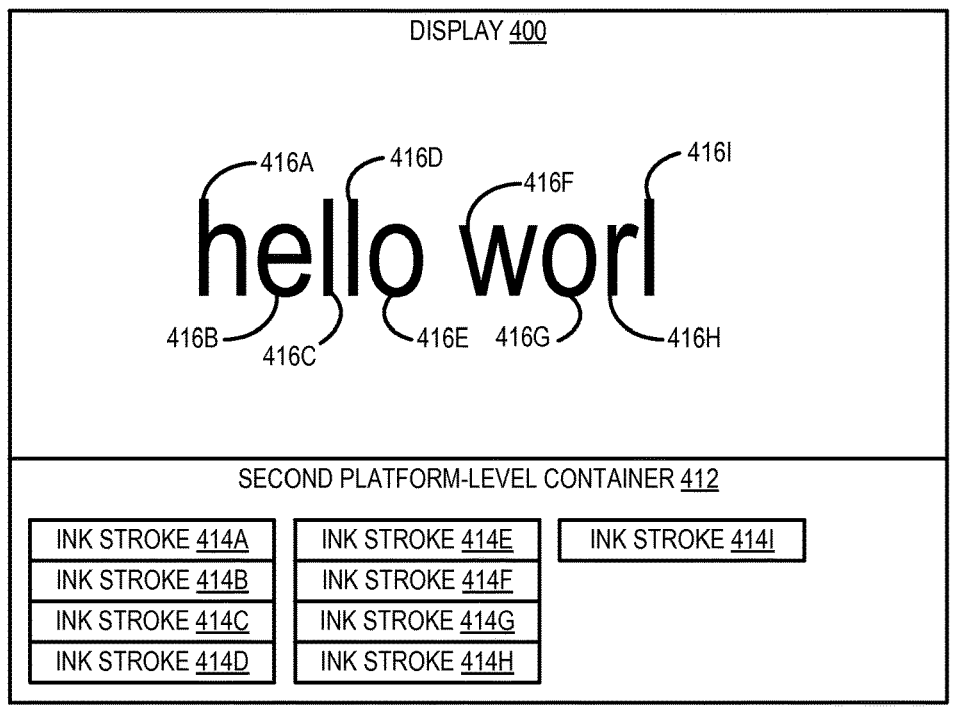

In an example shown in FIG. 4G, the stylus 410 provides touch input to the display 400 that surrounds the plurality of ink stroke visuals 406. In this example, an application monitoring the user input may recognize the user input as a gesture that triggers replacement of the plurality of ink stroke visuals 406 with typed letters. Accordingly, as shown in FIG. 4H, all ink stroke visuals corresponding to the ink stroke data structure held by the first platform-level container 402 are replaced with a different rendering in the form of a plurality of ink stroke visual 416 corresponding to ink stroke data structures 414 held by a second ink stroke container 412.

In some implementations, a platform-level renderer, such as the platform-level renderer 118 shown in FIG. 1 may be configured to operate in different processing modes. In one example, the platform-level renderer may operate in a default processing mode in which a first set of attributes define a manner in which ink stroke change events are recognized and/or a manner in which an ink stroke data structure is changed to an updated ink stroke data structure based on an ink stoke change event. Further, the platform-level renderer may operate in a custom processing mode in which a second set of attributes that differ from the first set of attributes define a manner in which ink stroke change events are processed. The type of processing mode of the platform-level renderer may be controlled in any suitable manner. In one example, one of the plurality of applications 116 shown in FIG. 1 may specify the processing mode of the platform-level renderer. In another example, the platform-level renderer itself may specify the processing mode base on various operating conditions of the computing system 100.

Figure 3:
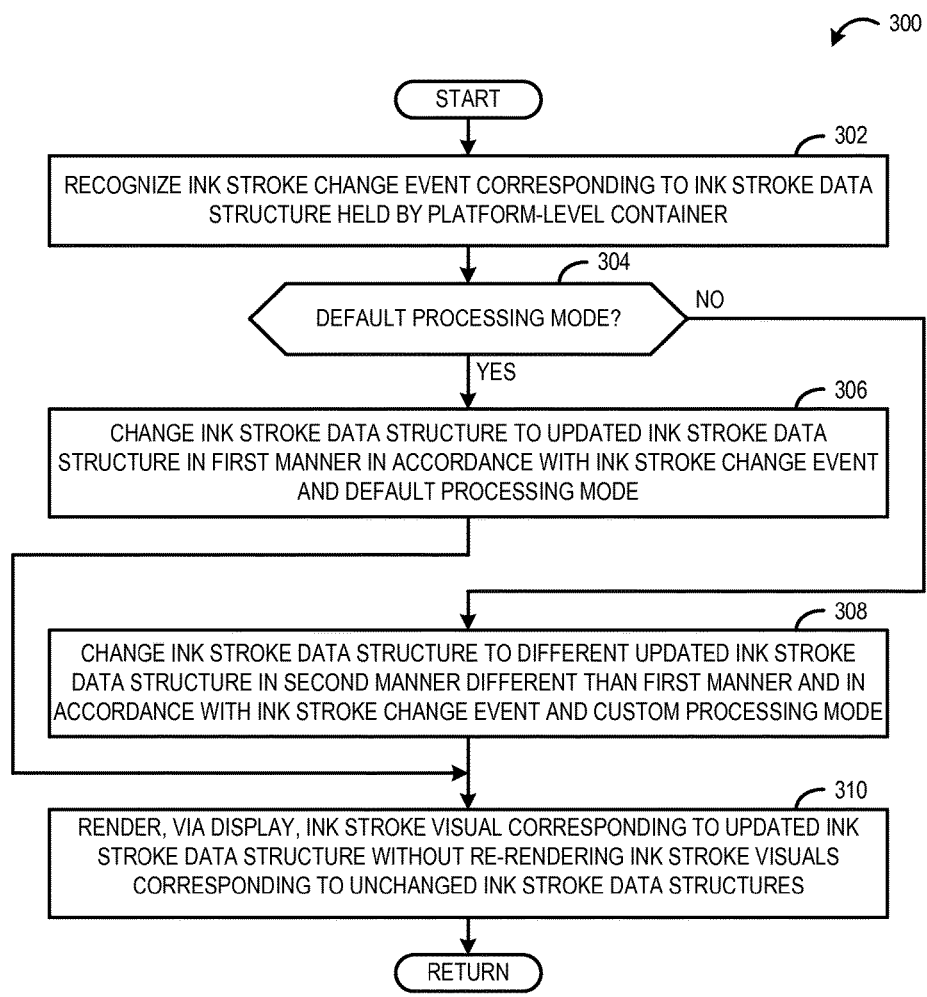
FIG. 3 shows another example method for rendering ink stroke visuals differently in different processing modes.

FIG. 3 shows an example method 300 for rendering ink stroke visuals based on different processing modes of a platform-level renderer. In one example, the method 300 is performed by the computing system 100 shown in FIG. 1. In another example, the method 300 is performed by the computing system 900 shown in FIG. 9. In some implementations, the method 300 may be incorporated or performed in cooperation with the method 200 shown in FIG. 2.

At 302, the method 300 includes recognizing an ink stroke change event corresponding to an ink stroke data structure held by the platform-level container.

At 304, the method 300 includes determining whether a platform-level render managing the platform-level container is operating in a default processing mode or a custom processing mode. The processing mode of the platform-level render may be determined in any suitable manner. In one example, the platform-level render may include a bit indicating whether the platform-level render is operating in the default processing mode or the custom processing mode, and the bit may be checked when the ink stroke change event is recognized to determine the processing mode. If the platform-level render is operating in the default processing mode, then the method 300 moves to 306. Otherwise, the platform-level render is operating in the custom processing mode, and the method moves to 308.

At 306, the method 300 includes changing the ink stroke data structure to an updated ink stroke data structure in a first manner in accordance with the ink stroke change event and the default processing mode.

At 308, the method 300 includes changing the ink stroke data structure to a different updated ink stroke data structure in a second manner different than the first manner and in accordance with the ink stroke change event and the custom processing mode.

At 310, the method 300 includes rendering, via the display, an ink stroke visual corresponding to the updated ink stroke data structure without re-rendering ink stroke visuals corresponding to unchanged ink stroke data structures.

Figure 7A:
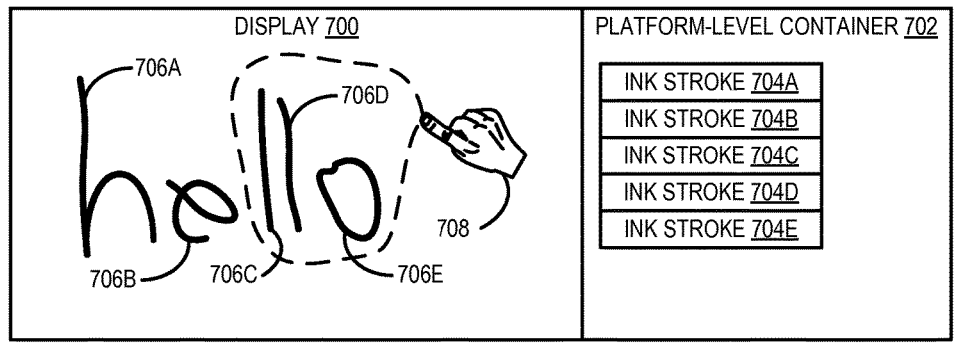
FIGS. 7A-7C show an example scenario in which an ink stroke change event changes an ink stroke data structure to updated ink stroke data structure differently based on a processing mode.
Figure 7B:
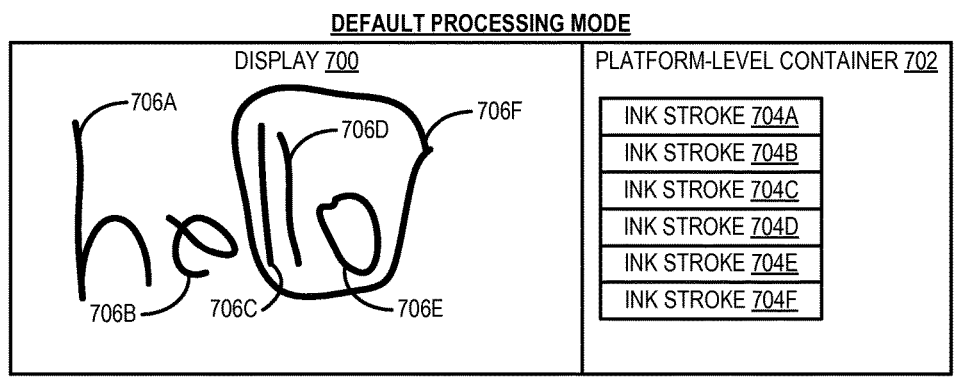
Figure 7C:
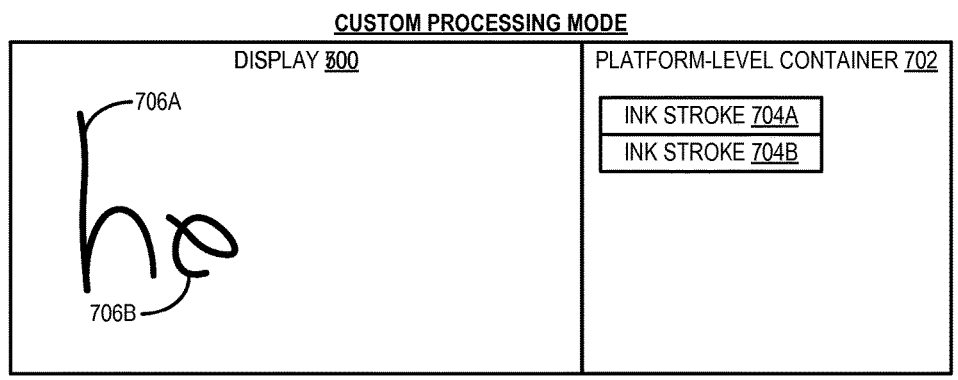

FIGS. 7A-7C show an example ink stroke change event that is processed differently based on a platform-level render operating in different processing modes. FIG. 7A shows an example display 700 and a platform-level container 702. In one example, the display 700 represents the display subsystem 102 shown in FIG. 1, and the platform-level container 702 represents the platform-level container 120 shown in FIG. 1. The platform-level container 702 includes a plurality of ink stroke data structures 704 (e.g., 704A, 704B, 704C, 704D, 704E). The plurality of ink stroke data structures 704 correspond to a plurality of ink stroke visuals 706 (e.g., 706A, 706B, 706C, 706D, 706E) rendered via the display 700. A finger 708 provides touch input to the display 700 that surrounds the ink stroke visuals 706C, 706D, 706E. The selection of the ink stroke visuals 706C, 706D, 706E based on the touch input via the finger 708 may be processed differently based on the processing mode of the platform-level render that manages the platform-level container 702.

In FIG. 7B, the platform-level render that manages the platform-level container 702 is operating in the default processing mode, which in this example, specifies that touch input via the finger 708 is recognized as an ink stroke change event that adds an ink stroke data structure 704F to the platform-level container 702. As such, the ink stroke visual 706F that corresponds to the ink stroke data structure 704F is rendered via the display 700 without re-rendering of the unchanged visual ink strokes 706A, 706B, 706C, 706D, 706E.

In FIG. 7C, the platform-level render that manages the platform-level container 702 is operating in the custom processing mode, which in this example, specifies that touch input via the finger 708 is recognized as an ink stroke change event that removes the ink stroke data structures 704C, 704D, 704E that were selected by the touch input from the platform-level container 702. As such, the ink stroke visuals 706C, 706D, 706E that correspond to the ink stroke data structures 704C, 704D, 704E are removed from the display 700.

The above described example may be generalized to indicate that touch input via a finger adds ink stroke visuals to the display, in the default processing mode (e.g., "inking" mode). On the other hand, touch input via the finger removes ink stroke visuals from the display, in the custom processing mode ("erasing" mode). In one example, the computing system 100 shown in FIG. 1 may switch from inking mode to erasing mode responsive to an "erase" affordance in the graphical user interface 104 being selected. Correspondingly, the computing system 100 may switch from erasing mode to inking mode responsive to the "erase" affordance in the graphical user interface 104 being de-selected. In another example, the graphical user interface 104 may include an affordance for each of Inking, Erasing, and Selecting that may be selected to switch to operation in the respective mode.

Furthermore, in some implementations, the different processing modes of the platform-level renderer may specify whether different types of user input produce an ink stroke change event depending on the processing mode.

Figure 8A:
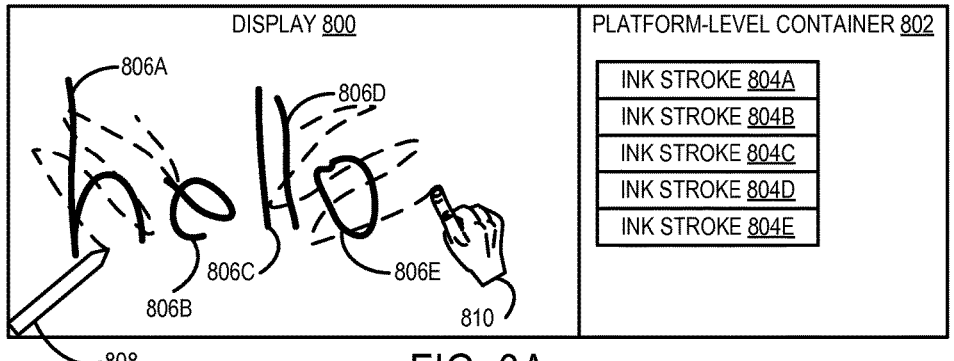
FIGS. 8A-8C show an example scenario in which different types of user input change ink stroke data structures differently based on a processing mode.
Figure 8B:
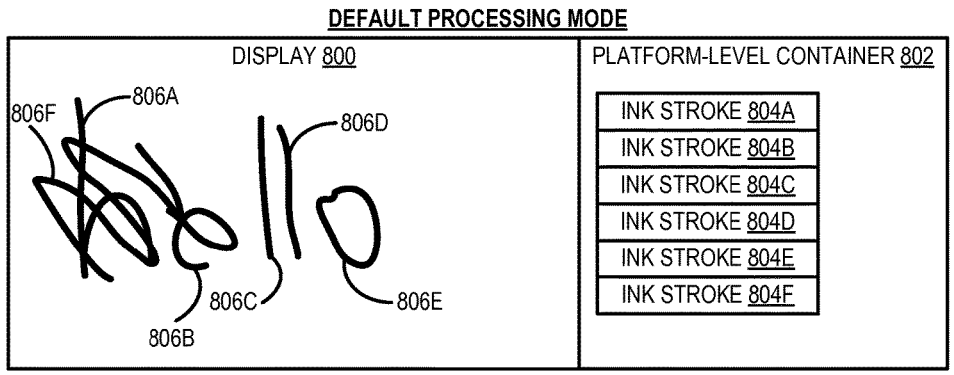
Figure 8C:
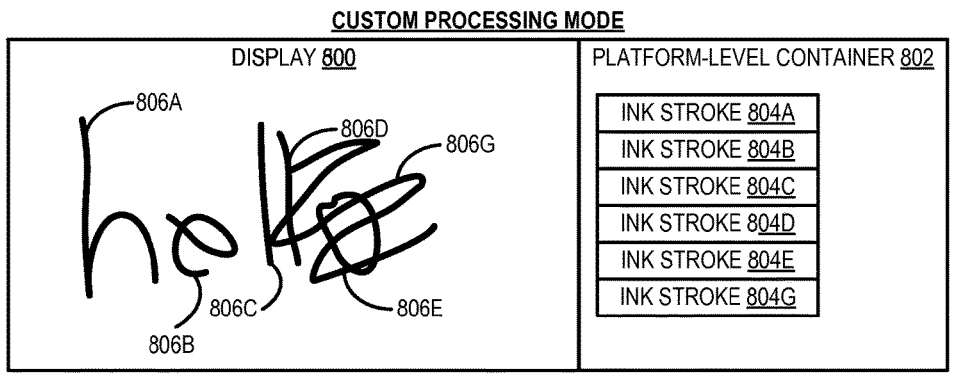

FIGS. 8A-8C show different types of user input that are selectively recognized as ink stroke change events based on a platform-level renderer operating in different processing modes. FIG. 8A shows an example display 800 and a platform-level container 802. In one example, the display 800 represents the display subsystem 102 shown in FIG. 1, and the platform-level container 802 represents the platform-level container 120 shown in FIG. 1. The platform-level container 802 includes a plurality of ink stroke data structures 804 (e.g., 804A, 804B, 804C, 804D, 804E). The plurality of ink stroke data structures 804 correspond to a plurality of ink stroke visuals 806 (e.g., 806A, 806B, 806C, 806D, 806E) rendered via the display 800. A stylus 808 provides touch input to the display 800 that overlaps the ink stroke visuals 806A, 806B. Further, a finger 810 provides touch input to the display 800 that overlaps the ink stroke visuals 806C, 806D, 806E. The user input provided by the stylus 808 and the user input provided by the finger 810 may be processed differently based on the processing mode of the platform-level render that manages the platform-level container 802.

In FIG. 8B, the platform-level render that manages the platform-level container 802 is operating in the default processing mode, which in this example, specifies that touch input via the stylus 808 is recognized as an ink stroke change event that adds an ink stroke data structure 804F to the platform-level container 802. Further, in this example, the default processing mode specifies that touch input via the finger 810 is not recognized as an ink stroke change event. In other words, inking is performed by the stylus 808 and not the finger 810 in the default processing mode. As such, an ink stroke visual 808F that corresponds to the ink stroke data structure 804F is rendered via the display 800 without re-rendering of the unchanged visual ink strokes 806A, 806B, 806C, 806D, 806E. For example, the default processing mode could specify that touch input via the finger 810 could be designated for another operation.

In FIG. 8C, the platform-level render that manages the platform-level container 802 is operating in the custom processing mode, which in this example, specifies that touch input via the finger 810 is recognized as an ink stroke change event that adds an ink stroke data structure 804G to the platform-level container 802. Further, in this example, the custom processing mode specifies that touch input via the stylus 808 is not recognized as an ink stroke change event. In other words, inking is performed by the finger 810 and not the stylus 808 in the custom processing mode. As such, an ink stroke visual 806G that corresponds to the ink stroke data structure 804G is rendered via the display 800 without re-rendering of the unchanged visual ink strokes 806A, 806B, 806C, 806D, 806E. For example, the custom processing mode could specify that touch input via the stylus 808 could be designated for another operation.

In some implementations, the custom processing mode may specify some ink stroke change events to be left unprocessed by the platform-level renderer. Instead, the ink stroke change events may be allowed to be processed by a particular application. For example, the platform-level renderer 118 may notify the application of the ink stroke change event, and the application may provide a change instruction to the platform-level renderer 118 to change an ink stroke data structure.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 900 schematically shows a non-limiting implementation of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. For example, the computing system 900 may correspond to the computing system 100 shown in FIG. 1.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 902 may include one or more processors configured to execute software instructions. Additionally or alternatively, the logic machine 902 may include one or more hardware or firmware logic machines configured to execute hardware or firmware instructions. Processors of the logic machine 902 may be single-core or multi-core, and the instructions executed thereon may be configured for sequential, parallel, and/or distributed processing. Individual components of the logic machine 902 optionally may be distributed among two or more separate devices, which may be remotely located and/or configured for coordinated processing. Aspects of the logic machine 902 may be virtualized and executed by remotely accessible, networked computing devices configured in a cloud-computing configuration.

Storage machine 904 includes one or more physical devices configured to hold instructions executable by the logic machine 902 to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

In one example, the logic machine 902 and the storage machine 904 may be used to instantiate the operating system 114, the plurality of applications 116, the platform-level renderer 118, and the one or more platform-level containers 120 shown in FIG. 1.

When included, display subsystem 906 may be used to present a visual representation of data held by storage machine 904. This visual representation may take the form of a graphical user interface (GUI). As the herein described methods and processes change the data held by the storage machine 904, and thus transform the state of the storage machine 904, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

In one example, the display subsystem 906 may correspond to the display subsystem 102 shown in FIG. 1. As such, the display subsystem 906 may be configured to render the one or more ink stroke visuals 106 in the graphical user interface 104.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

In one example, the input subsystem 908 may be configured to recognize user input to the computing system 900. Further, such user input may be used to recognize ink stroke change events. For example, the input subsystem 908 may be configured to recognize user input provided by the peripheral user input device 108 (e.g., a mouse) shown in FIG. 1. In another example, the input subsystem 908 may be configured to recognize touch input (e.g., via a touch sensor) provided by one or more fingers 110 and/or the stylus 112 shown in FIG. 1.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some embodiments, the communication subsystem 910 may allow computing system 900 to send and/or receive messages to and/or from other devices via a network such as the Internet.

In another example implementation, on a computing system, a method for rendering ink stroke visuals comprises maintaining a platform-level container configured to hold natively-supported ink stroke data structures, the platform-level container accessible to a plurality of different applications, rendering, via a display, an ink stroke visual corresponding to each ink stroke data structure held by the platform-level container, recognizing an ink stroke change event corresponding to an ink stroke data structure held by the platform-level container, changing the ink stroke data structure to an updated ink stroke data structure in accordance with the ink stroke change event, and rendering, via the display, an ink stroke visual corresponding to the updated ink stroke data structure without re-rendering ink stroke visuals corresponding to unchanged ink stroke data structures. In one example implementation that optionally may be combined with any of the features described herein, changing the ink stroke data structure to an updated ink stroke data structure includes one or more of adding an ink stroke data structure to the platform-level container, removing an ink stroke data structure from the platform-level container, and modifying a parameter of an ink stroke data structure of the platform-level container. In one example implementation that optionally may be combined with any of the features described herein, the method further comprises in response to a trigger, replacing, via the display, all ink stroke visuals corresponding to ink stroke data structures of the first platform-level container with a different rendering. In one example implementation that optionally may be combined with any of the features described herein, the ink stroke change event is received from a particular application of the plurality of applications. In one example implementation that optionally may be combined with any of the features described herein, the ink stroke change event is recognized responsive to a user input. In one example implementation that optionally may be combined with any of the features described herein, the method further comprises interpreting the user input as a particular gesture from a menu of recognizable gestures, and the ink stroke data structure is changed to an updated ink stroke data structure based on the particular gesture. In one example implementation that optionally may be combined with any of the features described herein, the particular gesture is an erase gesture, changing includes removing the ink stroke data structure from the platform-level container or flagging the ink stroke data structure for no display, and rendering, via the display, an ink stroke visual corresponding to the updated ink stroke data structure includes removing the ink stroke visual from the display. In one example implementation that optionally may be combined with any of the features described herein, the platform-level container is a first platform level container associated with a first area of a graphical user interface, and the method further comprises maintaining a second platform-level container associated with a second area of the graphical user interface different than the first area. In one example implementation that optionally may be combined with any of the features described herein, an ink stroke rendering behavior of the first platform-level container differs from an ink stroke rendering behavior of the second platform-level container. In one example implementation that optionally may be combined with any of the features described herein, an ink stroke change event associated with the first platform-level container is recognized responsive to user input of a first user input type directed to the first area, and an ink stroke change event associated with the second platform-level container is recognized responsive to user input of a second user input type directed to the second area, the second user input type differing from the first user input type.

In another example implementation, a computing system, comprises a logic machine, and a storage machine holding instructions executable by the logic machine to maintain a platform-level container configured to hold natively-supported ink stroke data structures, the platform-level container accessible to a plurality of different applications, render, via a display, an ink stroke visual corresponding to each ink stroke data structure held by the platform-level container, recognize an ink stroke change event corresponding to an ink stroke data structure held by the platform-level container, change the ink stroke data structure to an updated ink stroke data structure in accordance with the ink stroke change event, and render, via the display, an ink stroke visual corresponding to the updated ink stroke data structure without re-rendering ink stroke visuals corresponding to unchanged ink stroke data structures. In one example implementation that optionally may be combined with any of the features described herein, changing the ink stroke data structure to an updated ink stroke data structure includes one or more of adding an ink stroke data structure to the platform-level container, removing an ink stroke data structure from the platform-level container, and modifying a parameter of an ink stroke data structure of the platform-level container. In one example implementation that optionally may be combined with any of the features described herein, the storage machine further holds instructions executable by the logic machine to in response to a trigger, replace, via the display, all ink stroke visuals corresponding to ink stroke data structures of the first platform-level container with a different rendering. In one example implementation that optionally may be combined with any of the features described herein, the ink stroke change event is received from a particular application of the plurality of applications. In one example implementation that optionally may be combined with any of the features described herein, the ink stroke change event is recognized responsive to a user input. In one example implementation that optionally may be combined with any of the features described herein, the storage machine further holds instructions executable by the logic machine to interpret the user input as a particular gesture from a menu of recognizable gestures, and wherein the ink stroke data structure is changed to an updated ink stroke data structure based on the particular gesture. In one example implementation that optionally may be combined with any of the features described herein, the particular gesture is an erase gesture, changing includes removing the ink stroke data structure from the platform-level container, and rendering, via the display, an ink stroke visual corresponding to the updated ink stroke data structure includes removing the ink stroke visual from the display.

In another example implementation, on a computing system, a method for rendering ink stroke visuals comprises maintaining a first platform-level container associated with a first area of a graphical user interface, the first platform-level configured to hold natively-supported ink stroke data structures, the first platform-level container accessible to a plurality of different applications, maintaining a second platform-level container associated with a second area of the graphical user interface, the second platform-level container configured to hold natively-supported ink stroke data structures, the second platform-level container accessible to the plurality of different applications, rendering, via a display, an ink stroke visual corresponding to each ink stroke data structure held by the first platform-level container in the first area of the graphical user interface, rendering, via a display, an ink stroke visual corresponding to each ink stroke data structure held by the second platform-level container in the second area of the graphical user interface, recognizing a first ink stroke change event corresponding to a first ink stroke data structure held by the first platform-level container, changing the first ink stroke data structure to a first updated ink stroke data structure in accordance with the first ink stroke change event, rendering, via the display, a first ink stroke visual corresponding to the first updated ink stroke data structure in the first area of the graphical user interface without re-rendering ink stroke visuals in the graphical user interface corresponding to unchanged ink stroke data structures, recognizing a second ink stroke change event corresponding to a second ink stroke data structure held by the second platform-level container, changing the second ink stroke data structure held by the second platform-level container to a second updated ink stroke data structure in accordance with the second ink stroke change event, and rendering, via the display, a second ink stroke visual corresponding to the second updated ink stroke data structure in the second area of the graphical user interface without re-rendering ink stroke visuals in the graphical user interface corresponding to unchanged ink stroke data structures. In one example implementation that optionally may be combined with any of the features described herein, an ink stroke rendering behavior of the first platform-level container differs from an ink stroke rendering behavior of the second platform-level container. In one example implementation that optionally may be combined with any of the features described herein, an ink stroke change event associated with the first platform-level container is recognized responsive to user input of a first user input type directed to the first area, and an ink stroke change event associated with the second platform-level container is recognized responsive to user input of a second user input type directed to the second area, the second user input type differing from the first user input type.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system, a method for rendering ink stroke visuals, the method comprising:
   maintaining a platform-level container configured to hold natively-supported ink stroke data structures, the platform-level container accessible to a plurality of different applications such that each of the plurality of different applications can change the natively-supported ink stroke data structures directly in the platform-level container;
   rendering, via a display, an ink stroke visual corresponding to each ink stroke data structure held by the platform-level container;
   recognizing an ink stroke change event corresponding to an ink stroke data structure held by the platform-level container;
   changing the ink stroke data structure to an updated ink stroke data structure in accordance with the ink stroke change event directly in the platform-level container; and
   rendering, via the display, an ink stroke visual corresponding to the updated ink stroke data structure without re-rendering ink stroke visuals corresponding to unchanged ink stroke data structures.

2. The method of claim 1, wherein changing the ink stroke data structure to an updated ink stroke data structure includes one or more of adding an ink stroke data structure to the platform-level container, removing an ink stroke data structure from the platform-level container, and modifying a parameter of an ink stroke data structure of the platform-level container.

3. The method of claim 1, further comprising:
in response to a trigger, replacing, via the display, all ink stroke visuals corresponding to ink stroke data structures of the platform-level container with a different rendering.

4. The method of claim 1, wherein the ink stroke change event is received from a particular application of the plurality of applications.

5. The method of claim 1, wherein the ink stroke change event is recognized responsive to a user input.

6. The method of claim 5, further comprising:
interpreting the user input as a particular gesture from a menu of recognizable gestures, and wherein the ink stroke data structure is changed to an updated ink stroke data structure based on the particular gesture.

7. The method of claim 6, wherein the particular gesture is an erase gesture, wherein changing includes removing the ink stroke data structure from the platform-level container or flagging the ink stroke data structure for no display, and wherein rendering, via the display, an ink stroke visual corresponding to the updated ink stroke data structure includes removing the ink stroke visual from the display.

8. The method of claim 1, wherein the platform-level container is a first platform level container associated with a first area of a graphical user interface, and wherein the method further comprises, maintaining a second platform-level container associated with a second area of the graphical user interface different than the first area.

9. The method of claim 8, wherein an ink stroke rendering behavior of the first platform-level container differs from an ink stroke rendering behavior of the second platform-level container.

10. The method of claim 9, wherein an ink stroke change event associated with the first platform-level container is recognized responsive to user input of a first user input type directed to the first area, and an ink stroke change event associated with the second platform-level container is recognized responsive to user input of a second user input type directed to the second area, the second user input type differing from the first user input type.

11. A computing system, comprising:
a logic machine; and
a storage machine holding instructions executable by the logic machine to:
  maintain a platform-level container configured to hold natively-supported ink stroke data structures, the platform-level container accessible to a plurality of different applications such that each of the plurality of different applications can change the natively-supported ink stroke data structures directly in the platform-level container;
  render, via a display, an ink stroke visual corresponding to each ink stroke data structure held by the platform-level container;
  recognize an ink stroke change event corresponding to an ink stroke data structure held by the platform-level container;
  change the ink stroke data structure to an updated ink stroke data structure in accordance with the ink stroke change event directly in the platform-level container; and
  render, via the display, an ink stroke visual corresponding to the updated ink stroke data structure without re-rendering ink stroke visuals corresponding to unchanged ink stroke data structures.

12. The computing system of claim 11, wherein changing the ink stroke data structure to an updated ink stroke data structure includes one or more of adding an ink stroke data structure to the platform-level container, removing an ink stroke data structure from the platform-level container, and modifying a parameter of an ink stroke data structure of the platform-level container.

13. The computing system of claim 11, wherein the storage machine further holds instructions executable by the logic machine to:
in response to a trigger, replace, via the display, all ink stroke visuals corresponding to ink stroke data structures of the first platform-level container with a different rendering.

14. The computing system of claim 11, wherein the ink stroke change event is received from a particular application of the plurality of applications.

15. The computing system of claim 11, wherein the ink stroke change event is recognized responsive to a user input.

16. The computing system of claim 15, wherein the storage machine further holds instructions executable by the logic machine to:
interpret the user input as a particular gesture from a menu of recognizable gestures, and wherein the ink stroke data structure is changed to an updated ink stroke data structure based on the particular gesture.

17. The computing system of claim 16, wherein the particular gesture is an erase gesture, wherein changing includes removing the ink stroke data structure from the platform-level container, and wherein rendering, via the display, an ink stroke visual corresponding to the updated ink stroke data structure includes removing the ink stroke visual from the display.

18. On a computing system, a method for rendering ink stroke visuals, the method comprising:
maintaining a first platform-level container associated with a first area of a graphical user interface, the first platform-level configured to hold natively-supported ink stroke data structures, the first platform-level container accessible to a plurality of different applications such that each of the plurality of different applications can change the natively-supported ink stroke data structures directly in the first platform-level container;
maintaining a second platform-level container associated with a second area of the graphical user interface, the second platform-level container configured to hold natively-supported ink stroke data structures, the second platform-level container accessible to the plurality of different applications such that each of the plurality of different applications can change the natively-supported ink stroke data structures directly in the second platform-level container;
rendering, via a display, an ink stroke visual corresponding to each ink stroke data structure held by the first platform-level container in the first area of the graphical user interface;
rendering, via a display, an ink stroke visual corresponding to each ink stroke data structure held by the second platform-level container in the second area of the graphical user interface;
recognizing a first ink stroke change event corresponding to a first ink stroke data structure held by the first platform-level container;
changing the first ink stroke data structure to a first updated ink stroke data structure in accordance with the first ink stroke change event directly in the first platform-level container;
rendering, via the display, a first ink stroke visual corresponding to the first updated ink stroke data structure in the first area of the graphical user interface without re-rendering ink stroke visuals in the graphical user interface corresponding to unchanged ink stroke data structures;

recognizing a second ink stroke change event corresponding to a second ink stroke data structure held by the second platform-level container;

changing the second ink stroke data structure held by the second platform-level container to a second updated ink stroke data structure in accordance with the second ink stroke change event directly in the second platform-level container; and rendering, via the display, a second ink stroke visual corresponding to the second updated ink stroke data structure in the second area of the graphical user interface without re-rendering ink stroke visuals in the graphical user interface corresponding to unchanged ink stroke data structures.

19. The method of claim 18, wherein an ink stroke rendering behavior of the first platform-level container differs from an ink stroke rendering behavior of the second platform-level container.

20. The method of claim 18, wherein an ink stroke change event associated with the first platform-level container is recognized responsive to user input of a first user input type directed to the first area, and an ink stroke change event associated with the second platform-level container is recognized responsive to user input of a second user input type directed to the second area, the second user input type differing from the first user input type.

* * * * *